(12) United States Patent
Gittins et al.

(10) Patent No.: US 8,985,231 B2
(45) Date of Patent: Mar. 24, 2015

(54) SELECTIVE DISPLACEMENT OF WATER IN PRESSURE COMMUNICATION WITH A HYDROCARBON RESERVOIR

(75) Inventors: Simon Gittins, Alberta (CA); Harbir Chhina, Alberta (CA); Katherine Stavropoulos, Alberta (CA); Xiaohuan Liu, Alberta (CA); Alvin Winestock, Alberta (CA)

(73) Assignee: Cenovus Energy, Inc., Calgary (CA)

( * ) Notice: Subject to any disclaimer, the term of this patent is extended or adjusted under 35 U.S.C. 154(b) by 94 days.

(21) Appl. No.: 13/370,624

(22) Filed: Feb. 10, 2012

(65) Prior Publication Data

US 2012/0205127 A1    Aug. 16, 2012

Related U.S. Application Data

(63) Continuation-in-part of application No. 13/108,469, filed on May 16, 2011, now abandoned.

(60) Provisional application No. 61/441,970, filed on Feb. 11, 2011.

(30) Foreign Application Priority Data

Dec. 8, 2011 (CA) ................................. 2761321

(51) Int. Cl.
*E21B 43/30* (2006.01)
*E21B 43/25* (2006.01)

(52) U.S. Cl.
USPC ................... 166/401; 166/245; 166/305.1

(58) Field of Classification Search
None
See application file for complete search history.

(56) References Cited

U.S. PATENT DOCUMENTS

| | | | |
|---|---|---|---|
| 1,198,078 A * | 9/1916 | Squires | 166/268 |
| 3,032,101 A | 5/1962 | Woertz et al. | |
| 3,152,640 A | 10/1964 | Marx | |
| 3,270,809 A * | 9/1966 | Connally et al. | 166/245 |
| 3,298,435 A * | 1/1967 | Schoenfeld et al. | 166/268 |

(Continued)

FOREIGN PATENT DOCUMENTS

| | | | | |
|---|---|---|---|---|
| CA | 1304287 C | 6/1992 | | |
| CA | 2 696 512 A1 | 9/2010 | | |
| WO | WO 2010009118 A1 * | 1/2010 | ............ | E21B 43/16 |

OTHER PUBLICATIONS

Pooladi-Darvish M. et al., SAGD Operations in the Presence of Overlying Gas Cap and Water Layer—Effect of Shale Layers, Journal of Canadian Petroleum Technology, Jun. 2002, vol. 41, No. 6, pp. 1-12.

(Continued)

*Primary Examiner* — Angela M DiTrani
*Assistant Examiner* — Anuradha Ahuja
(74) *Attorney, Agent, or Firm* — Christie, Parker & Hale, LLP

(57) ABSTRACT

Methods and systems are provided for selectively displacing water from a hydraulically continuous water zone in a porous geological formation. The target zone to be displaced is defined by a hydrodynamically maintained pressure differential, which has been shown to be capable of confining an expanding injected gas zone. One or more gas injection wells and water production wells are located within the zone. During pressurized gas injection within the zone, the gas displaces water downward within the confined zone such that water is selectively produced from the target zone and the injected gas zone is confined within the hydraulically continuous water zone.

47 Claims, 15 Drawing Sheets

(56) References Cited

U.S. PATENT DOCUMENTS

| | | | |
|---|---|---|---|
| 3,309,141 A | | 3/1967 | Fitch et al. |
| 3,545,545 A | * | 12/1970 | Allen .................... 166/402 |
| 3,687,198 A | * | 8/1972 | Hearn et al. ............ 166/402 |
| 4,116,275 A | | 9/1978 | Butler et al. |
| 4,161,047 A | * | 7/1979 | Riley ..................... 166/266 |
| 4,223,728 A | * | 9/1980 | Pegg ...................... 166/266 |
| 4,311,340 A | | 1/1982 | Lyons et al. |
| 4,344,485 A | | 8/1982 | Butler |
| 4,465,136 A | * | 8/1984 | Troutman ............... 166/402 |
| 4,623,283 A | * | 11/1986 | Chew ..................... 405/270 |
| 4,817,720 A | | 4/1989 | Friedman et al. |
| 5,030,036 A | | 7/1991 | Huff et al. |
| 5,085,274 A | * | 2/1992 | Puri et al. ............... 166/252.1 |
| 5,350,014 A | | 9/1994 | McKay |
| 5,407,009 A | | 4/1995 | Butler |
| 2003/0000696 A1 | * | 1/2003 | Mones .................... 166/245 |
| 2003/0192691 A1 | * | 10/2003 | Vinegar et al. .......... 166/250.12 |
| 2005/0092486 A1 | * | 5/2005 | Mones .................... 166/245 |
| 2007/0144732 A1 | * | 6/2007 | Kim et al. ............... 166/145 |
| 2008/0087427 A1 | * | 4/2008 | Kaminsky et al. ....... 166/272.1 |
| 2008/0217003 A1 | * | 9/2008 | Kuhlman et al. ......... 166/245 |
| 2010/0098492 A1 | | 4/2010 | Dickinson, III et al. |
| 2011/0180254 A1 | * | 7/2011 | Van Den Berg et al. ... 166/270 |

OTHER PUBLICATIONS

Bao Xia et al., Numerical Simulation and Optimation of the SAGD Process in Surmont Oil Sands Lease, Society of Petroleum Engineers, SPE 137579 presented at the Abu Dhabi International Petroleum Exhibition & Conference held in Abu Dhabi, UAE, Nov. 1-4, 2010; pp. 1-13.

\* cited by examiner

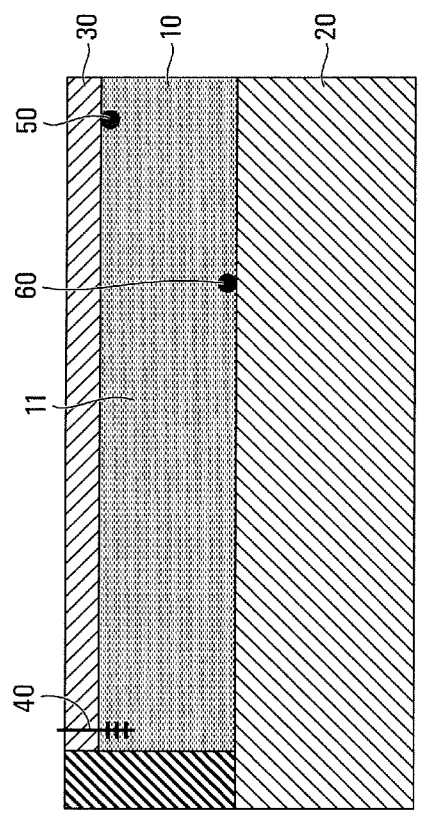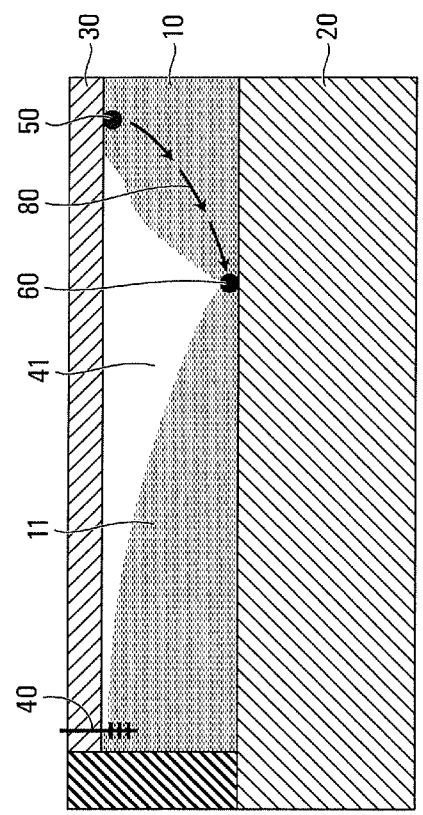
FIG. 1
FIG. 2

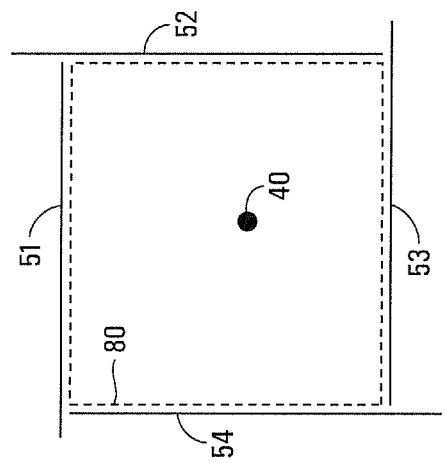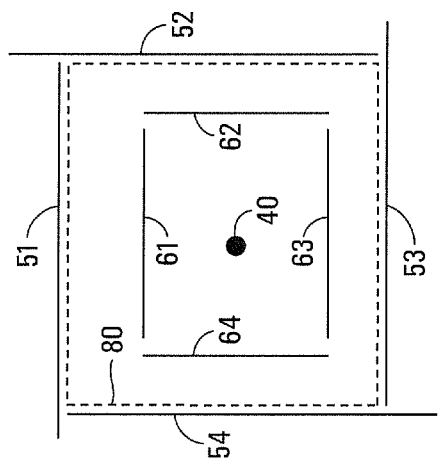

SELECTIVE DISPLACEMENT OF WATER IN PRESSURE COMMUNICATION WITH A HYDROCARBON RESERVOIR

CROSS-REFERENCE TO RELATED APPLICATION(S)

This application claims the benefit of U.S. Provisional Application No. 61/441,970 filed on Feb. 11, 2011, claims priority to Canadian Patent Application No. 2,761,321 filed Dec. 8, 2011, and is a continuation-in-part of U.S. application Ser. No. 13/108,469 filed on May 16, 2011 which claims priority to Canadian Application No. 2,739,953 filed on May 11, 2011 and which also claims the benefit of U.S. Provisional Application No. 61/441,970 filed on Feb. 11, 2011, and the specifications for Canadian Patent Application No. 2,761, 321, U.S. patent application Ser. No. 13/108,469, and Canadian Application No. 2,739,953, are hereby incorporated by reference.

FIELD OF THE INVENTION

The present invention relates generally to the selective displacement of water from an area within a porous and permeable geological formation. More particularly, the present invention relates to a method for selectively displacing a portion of an aqueous fluid zone with injected gas in a displacement zone that is in pressure communication with a hydrocarbon reservoir.

BACKGROUND OF THE INVENTION

A variety of processes are used to recover viscous hydrocarbons, such as heavy oils and bitumen, from underground deposits. There are extensive deposits of viscous hydrocarbons around the world, including large deposits in the Northern Alberta tar sands, that are not amenable to standard oil well production technologies. The primary problem associated with producing hydrocarbons from such deposits is that the hydrocarbons are too viscous to flow at commercially relevant rates at the temperatures and pressures present in the reservoir. In some cases, such deposits are mined using open-pit mining techniques to extract the hydrocarbon-bearing material for later processing to extract the hydrocarbons. Alternatively, thermal techniques may be used to heat the reservoir to produce the heated, mobilized hydrocarbons from wells. One such technique for utilizing a single horizontal well for injecting heated fluids and producing hydrocarbons is described in U.S. Pat. No. 4,116,275, which also describes some of the problems associated with the production of mobilized viscous hydrocarbons from horizontal wells.

One thermal method of recovering viscous hydrocarbons using two vertically spaced horizontal wells is known as steam-assisted gravity drainage (SAGD). Various embodiments of the SAGD process are described in Canadian Patent No. 1,304,287 and corresponding U.S. Pat. No. 4,344,485. In the SAGD process, steam is pumped through an upper, horizontal, injection well into a viscous hydrocarbon reservoir while hydrocarbons are produced from a lower, parallel, horizontal, production well vertically spaced proximate to the injection well. The injection and production wells are typically located close to the bottom of the hydrocarbon deposit.

It is believed that the SAGD process works as follows. The injected steam initially mobilises the in-place hydrocarbon to create a "steam chamber" in the reservoir around and above the horizontal injection well. The term "steam chamber" means the volume of the reservoir which is saturated with injected steam and from which mobilised oil has at least partially drained. As the steam chamber expands upwardly and laterally from the injection well, viscous hydrocarbons in the reservoir are heated and mobilized, especially at the margins of the steam chamber where the steam condenses and heats a layer of viscous hydrocarbons by thermal conduction. The mobilized hydrocarbons (and aqueous condensate) drain under the effects of gravity towards the bottom of the steam chamber, where the production well is located. The mobilized hydrocarbons are collected and produced from the production well. The rate of steam injection and the rate of hydrocarbon production may be modulated to control the growth of the steam chamber to ensure that the production well remains located at the bottom of the steam chamber in an appropriate position to collect mobilized hydrocarbons.

Alternative primary recovery processes may be used that employ thermal and non-thermal components to mobilize oil. For example, light hydrocarbons may be used to mobilize heavy oil. U.S. Pat. No. 5,407,009 teaches an exemplary technique of injecting a hydrocarbon solvent vapour, such as ethane, propane or butane, to mobilize hydrocarbons in the reservoir.

Heavy oil recovery techniques such as SAGD create mobile zone chambers in a reservoir, from which at least some of the original oil-in-place has been recovered. However, reservoirs depleted by such processes typically contain a significant volume of residual hydrocarbons. There remains a need for methods that may be used to recover these residual hydrocarbons.

In oil sand deposits, bitumen-containing zones or formations of interest for in situ production may be in pressure communication with an aqueous fluid zone, such as overlying or underlying water zones. In such situations, application of in situ recovery techniques to recover the bitumen may be made more difficult by the presence of water. Conversely, the water zone or aquifer may itself represent a valuable resource that may be adversely effected by efforts to recover a neighboring hydrocarbon deposit.

In one example of the difficulties that may be occasioned by the present of water in a heavy oil deposit involves the situation that occurs when a water zone or aquifer comes into hydraulic contact with the expanding steam chamber of a steam assisted gravity drainage (SAGD) operation. When this occurs, water can flow into the steam chamber to quench the SAGD process, and thermal energy may also be lost into the water zone, so that top and bottom water zones have come be referred to as thief zones, a term which is also applied for similar reasons to gas zones adjoining heavy oil deposits.

In the context of the present application, various terms are used in accordance with what is understood to be the ordinary meaning of those terms. For example, "petroleum" is a naturally occurring mixture consisting predominantly of hydrocarbons in the gaseous, liquid or solid phase. In the context of the present application, the words "petroleum" and "hydrocarbon" are used to refer to mixtures of widely varying composition. The production of petroleum from a reservoir necessarily involves the production of hydrocarbons, but is not limited to hydrocarbon production. Similarly, processes that produce hydrocarbons from a well will generally also produce petroleum fluids that are not hydrocarbons. In accordance with this usage, a process for producing petroleum or hydrocarbons is not necessarily a process that produces exclusively petroleum or hydrocarbons, respectively. "Fluids", such as petroleum fluids, include both liquids and gases.

It is common practice to segregate petroleum substances of high viscosity and density into two categories, "heavy oil"

and "bitumen". For example, some sources define "heavy oil" as a petroleum that has a mass density of greater than about 900 kg/m3. Bitumen is sometimes described as that portion of petroleum that exists in the semi-solid or solid phase in natural deposits, with a mass density greater than about 1000 kg/m$^3$ and a viscosity greater than 10,000 centipoise (cP; or 10 Pa·s) measured at original temperature in the deposit and atmospheric pressure, on a gas-free basis. Although these terms are in common use, references to heavy oil and bitumen represent categories of convenience, and there is a continuum of properties between heavy oil and bitumen. Accordingly, references to heavy oil and/or bitumen herein include the continuum of such substances, and do not imply the existence of some fixed and universally recognized boundary between the two substances. In particular, the term "heavy oil" includes within its scope all "bitumen" including hydrocarbons that are present in semi-solid or solid form.

A reservoir is a subsurface formation containing one or more natural accumulations of moveable petroleum, which are generally confined by relatively impermeable rock. In a reservoir, the mobility of entrained fluids, such as petroleum, may be defined as the ratio of permeability to viscosity. The higher the permeability, all other things being equal, the higher the mobility. Correspondingly, the higher the viscosity, the lower the mobility. A "mobile zone" within a reservoir is a contiguous region characterised as having greater mobility than adjoining regions. The mobility of fluids within the mobile zone may vary, and some regions within a mobile zone may in fact exhibit less mobility than adjoining regions, while the mobile zone as a whole is nevertheless characterised as a region of relatively high mobility. Accordingly, the term "mobile zone" as used herein is a relative term, meaning that the zone referred to contains a fluid that is more mobile than fluids in adjoining zones.

An "oil sand" or "tar sand" reservoir is generally comprised of strata of sand or sandstone containing petroleum. Mobile zones may exist in oil sand or tar sand reservoirs, within or across strata, and may extend into adjoining strata.

A "chamber" within a reservoir or formation is a region that is in fluid communication with a particular well or wells, such as an injection or production well. For example, in a SAGD process, a steam chamber is the region of the reservoir in fluid communication with a steam injection well, which is also the region that is subject to depletion, primarily by gravity drainage, into a production well. In some processes, chambers that are in fluid communication with a single well may be enlarged so that they then communicate with additional wells or chambers, when this occurs it may be characterised as a "breakthrough" of fluid communication from one well to another, or a coalescence of steam chambers. In accordance with the foregoing, in the context of the present invention, a "mobile zone chamber" is a chamber that encompasses a mobile zone.

A wide variety of horizontal well drilling techniques are known. In typical horizontal wells, a single well will generally have segments that are primarily horizontal, as well as segments that are primarily vertical. In the context of the present invention, a generally horizontal well segment in a reservoir is a segment of a well that has a horizontal distance that is at least as great as its vertical distance within the hydrocarbon reservoir.

SUMMARY OF THE INVENTION

In one aspect, the invention provides methods and systems, such as an arrangement of wells, for selectively displacing aqueous fluid from an aquifer or other hydraulically continuous aqueous fluid zone. A target region of the formation may be selected that is in pressure communication with a hydrocarbon reservoir, such as a zone within a top or bottom water zone associated with an oil sands reservoir. Methods of the invention involve hydrodynamically adjusting aqueous fluid pressures, so as to provide a horizontal fluid pressure differential within the zone. This pressure differential is arranged to define a low pressure aqueous fluid zone within a high pressure aqueous fluid zone. Simulations have established that aqueous fluid pressures may be arranged so that the high pressure aqueous fluid zone forms a circumferential zone of high fluid pressure that is capable of confining an expanding zone of injected gas, to displace water selectively within the target area.

As gas is injected into the low pressure aqueous fluid zone it displaces the aqueous fluid, which is produced, forming an injected gas zone in the formation above the receding top of the low pressure aqueous fluid zone. As more gas is injected, the low pressure aqueous fluid zone moves down, and the injected gas zone expands. Simulations have shown that it is possible to confine the expanding zone of injected gas by maintaining hydrodynamic conditions so that a circumferential zone of high aqueous fluid pressure has a confining fluid pressure that is: i) greater than the maximum aqueous fluid pressure at the top of the low pressure aqueous fluid zone; and, ii) greater than the maximum gas pressure in the injected gas zone. These simulations have established that it is possible to hydrodynamically adjust aqueous fluid pressures by producing aqueous fluid from the target region, while injecting gas into the low pressure aqueous fluid zone. Alternatively, a series of barrier injection wells positioned to define the target region may be operated to inject aqueous fluid into the high pressure aqueous fluid zone, to form the circumferential zone of high aqueous fluid pressure that confines the injected gas. In this embodiment, produced water may for example be re-circulated into the barrier injection wells.

In one aspect of the invention, the process of de-watering the target zone may be carried out to facilitate recovery of hydrocarbons from the hydrocarbon reservoir associated with the target zone. For example, a SAGD process may be facilitated by the displacement of water from a thief zone prior to contact with the steam chamber. In an aspect of this approach, the SAGD process may be operated so that the pressure within the steam chamber approximates the pressure in the injected gas zone when the steam chamber contacts the injected gas zone in the target region, to reduce thermal loss into the gas zone.

BRIEF DESCRIPTION OF THE DRAWINGS

Embodiments of the present invention will now be described, by way of example only, with reference to the attached Figures, wherein:

FIG. 1 is a vertical cross-sectional view of a formation showing well configuration and formation composition prior to initiating displacement;

FIG. 2 is a vertical cross-sectional view of a formation showing well configuration and formation composition during displacement treatment;

FIGS. 3 and 4 show horizontal cross-sectional or plan views of a well configuration about a target zone;

DETAILED DESCRIPTION

Figure 5:
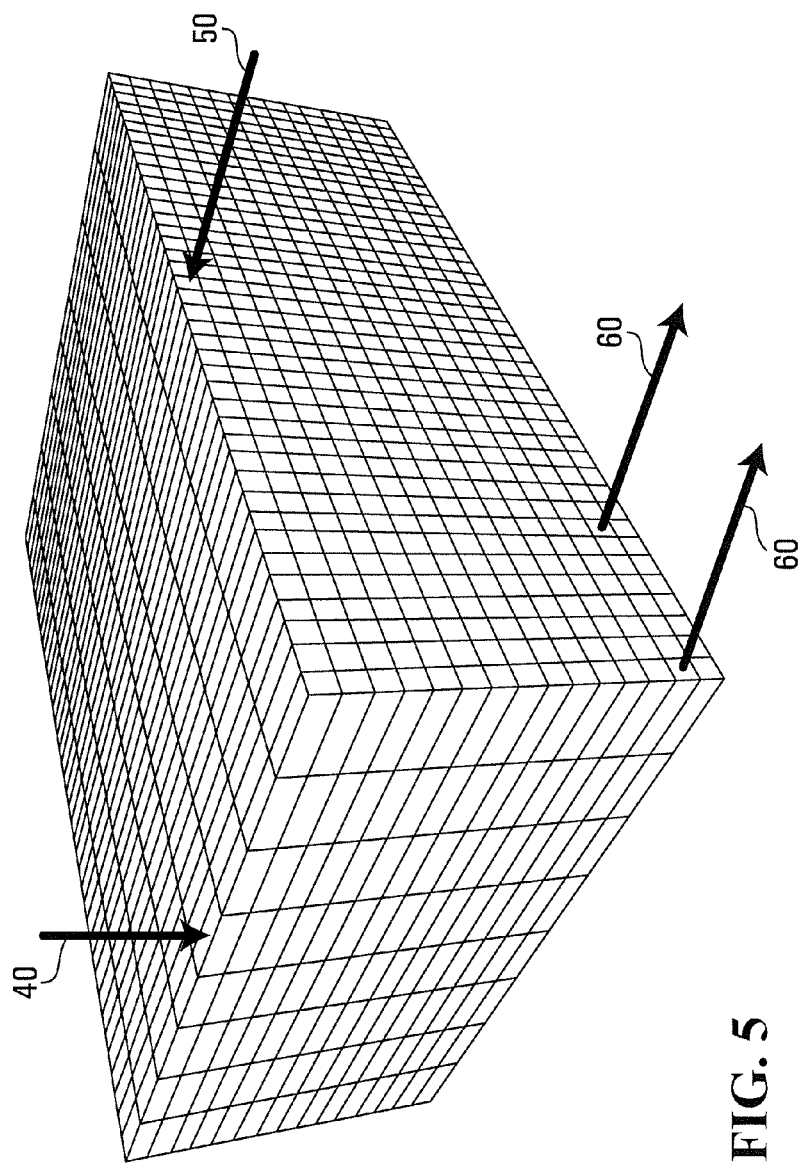
FIG. 5 is a three dimensional computer simulated schematic of an example well configuration, shown in half element form.

Generally, the present invention provides methods and systems for selectively displacing a volume of water (or more accurately an aqueous fluid) from a permeable underground formation with an amount of pressurized gas. The methods of the invention are selective in the sense that water is displaced from a target zone of a hydraulically continuous aqueous fluid zone. A target region of the formation may for example be selected that is in pressure communication with a hydrocarbon reservoir, such as a target zone within a larger top or bottom water zone associated with an oil sands reservoir.

Methods of the invention involve an initial stage of hydrodynamically adjusting aqueous fluid pressures, so as to provide a horizontal fluid pressure differential within the zone, to define a low pressure zone within a high pressure fluid zone. As gas is injected into the low pressure fluid zone, it displaces the fluid, which is produced, forming an injected gas zone in the formation above the receding top of a low pressure fluid zone. As more gas is injected, the low pressure fluid zone moves down, and the injected gas zone expands.

Simulations have surprisingly shown that it is possible to confine the expanding zone of injected gas by arranging hydrodynamic conditions so that a circumferential zone of relatively high fluid pressure maintains a confining fluid pressure that is: i) greater than the maximum fluid pressure at the top of the low pressure aqueous fluid zone (so that the gas zone preferentially expands into the low pressure fluid zone); and, ii) greater than the maximum gas pressure in the injected gas zone (so that the injected gas zone is confined by the high pressure fluid zone).

Simulations have established that it is possible to hydrodynamically adjust aqueous fluid pressures by producing aqueous fluid from the target region, while injecting gas into the low pressure aqueous fluid zone. Alternatively, a series of barrier injection wells positioned to define the target region may be operated to inject aqueous fluid into the high pressure aqueous fluid zone, to form the circumferential zone of high aqueous fluid pressure that confines the injected gas. In this embodiment, produced water may for example be re-circulated into the barrier injection wells.

In selected embodiments, gas injection pressures, and reservoir pressures in a de-watered zone associated with an oil sands or heavy oil reservoir may for example be as high as 6,000 kPa to 7,000 kPa. In general, gas injection pressures may be selected to be between the original reservoir pressure or up to 1000 kPa below the original reservoir pressure, depending in large part on the de-watering zone thickness and permeability. Gas injection rates, and corresponding water production rates may be from thousands to tens of thousands of m3/day.

In various aspects, the invention permits immiscible displacement of water from the target region. Such isolated displacement exploits the density and viscosity contrast between the gas and water phases to displace water to the surface.

In alternative aspects, methods of the invention may be used to sequentially isolate and displace segments of a larger porous reservoir.

In selected embodiments, the systems and methods of the invention allow a displacement zone or target region, for example within a substantially horizontal aquifer or hydraulically continuous aqueous fluid zone, to be hydrodynamically isolated from the surrounding aqueous fluid zone.

In an alternative embodiment, the invention utilizes a series of water injection wells around the target region, otherwise referred to as barrier wells, concurrent with water production from within the target region. Suitable operation of these wells will establish a hydraulic pressure barrier around the target region, forming zone of high aqueous fluid pressure. Once a circumferentially continuous zone of high aqueous fluid pressure is established, hydrodynamic conditions may be maintained by continued injection of water into the barrier wells, along with controlled gas injection and water production to/from the isolated target region, to allow a low pressure aqueous fluid zone to be replaced over time with an injected gas zone.

In some embodiments, barrier wells may be operated while monitoring the density contrast, viscosity contrast, and/or immiscibility of the injected gas and water. Monitoring of these properties of the native and injected fluids may facilitate the maintenance of hydrodynamic conditions so as to reduce coning and fingering of injected gas. In some embodiments, the injection and production wells may for example be operated to mitigate or prevent migration of injected gas past the circumferentially continuous zone of high aqueous fluid pressure established by the barrier wells, and to reduce gas coning or fingering into water production well(s).

In embodiments in which barrier wells are established to create one or more isolated target regions across an aquifer, pressurized non-condensing gas may be injected into each target region as barrier zones of confining fluid pressure are established. The relative positions of the barrier wells (and the hydraulic barriers of confining fluid pressure which they create), the gas injection well(s), the water production well(s), and the manner in which these wells are operated, may be orchestrated to maintain hydrodynamic conditions so as to prevent or mitigate uncontrolled lateral gas override. In the case of an outcropping aquifer, for example, these conditions may be maintained so as to avoid the atmospheric emission of injected gas. In exemplary embodiments characterized by simulations, it has been established that the tendency of injected gas to channel or cone into the produced water stream can indeed be limited and/or prevented by appropriate operational monitoring and control to maintain the necessary hydrodynamic conditions. In particular, it has been demonstrated that pressurized gas may be injected into the isolated target region to displace the water immiscibly and under conditions of highly adverse mobility ratio.

In further alternative embodiments, the invention provides methods of producing water from a substantially horizontal, deep water zone or aquifer. In these embodiments, a target region is hydraulically isolated, and pressurized gas is injected into each target region. The lateral constraint of injected gas by a circumferentially continuous zone of high aqueous pressure facilitates localized displacement of water with gas, limiting lateral gas migration. In selected embodiments, a staged approach to water displacement is possible.

For example, a particular vertical segment of a porous formation may be isolated, drained, and the underlying hydrocarbon resources extracted, for example using thermal recovery process such as SAGD. For example, a SAGD process may be facilitated by the displacement of water from a thief zone prior to contact with the steam chamber. In an aspect of this approach, the SAGD process may be operated so that the pressure within the steam chamber approximates the pressure in the injected gas zone when the steam chamber contacts the injected gas zone in the target region, to reduce thermal loss into the gas zone. Regions of the aqueous fluid zone outside of the target region may be handled independently.

In alternative embodiments the injection, production, or barrier wells of the invention may be vertical wells, horizontal wells, or wells that are drilled directionally along a selected trajectory, or varying combinations thereof. The orientation and operation of the wells may be arranged so as to prevent or mitigate horizontal gas migration beyond the target region. In effect, this provides for the hydraulic isolation of the target region, providing a gas-confining barrier that includes a circumferential zone of high aqueous fluid pressure. The gas-confining barrier may be circumferentially continuous zone of high aqueous fluid pressure, or it may be a discontinuous zone that includes gas-confining barriers comprised of natural geological barriers.

In some embodiments, the hydraulically continuous aqueous fluid zone that contains the target region may have natural boundaries, for example having geological features that define the limits of the porous and permeable formation. Where a natural geological boundary is present adjacent to a target region, barrier wells may not be required at that location to confine the target region. In some embodiments, such natural barriers may be exploited to limit the number of barrier wells required for isolation of a particular target region. Natural geological barriers may have various orientation, for example being generally vertical or of varying slope, configuration, or structure.

It will be understood that the displacement of water from an isolated target region of the invention does not generally entail complete displacement or removal of the entire water volume. The desired or achievable proportion of water displaced in any application may be determined by many factors, such as formation characteristics, economic factors, and regulatory requirements. Exemplary degrees of aqueous fluid displacement from a target region may, for example, involve the removal of up to 90% of the water in the target region.

In the context of the present invention, reference is made to zones or regions within a geological formation, such as bitumen, water, and gas zones. It will be understood that this does not imply that the reservoir within a given fluid zone is saturated with any one fluid. For example, a bitumen zone may contain some water saturation distributed throughout the porous structure of the reservoir. For example, in a virgin rich oil sand, the pores may be 80 percent saturated with bitumen and 20 percent saturated with connate water. In addition, a gas zone or a water zone that is in hydraulic contact or pressure communication with a bitumen zone or oil sand zone may contain a relatively small bitumen saturation distributed throughout the porous medium. Water saturation generally needs to be high enough so that the water phase is mobile, which will generally involve a mobile water saturation>20% in the water zone.

In an alternative aspect, the invention involves an initial step of characterizing the nature and extent of an aquifer (for example identifying associated outcrops or subcrops). This initial characterization may be carried out to determine, identify or select one or more target regions. Similarly, suitable injection and production well locations may be identified or selected, for example to define a target region that is in pressure communication with an underlying hydrocarbon reservoir.

In selected embodiments, hydraulic barriers may be established in whole or in part using vertical and/or horizontal and/or directional fluid injection wells. Water or other fluid is injected into these barrier wells, to create a zone of high aqueous fluid pressure confining the target region. Injected fluid may circulate to water production well(s) present within the target region, or may otherwise migrate over time within the formation. The pressurized injection gas, thus confined, is therefore constrained to form an injected gas zone that expands downwardly as gas injection continues, with the top of the low pressure aqueous fluid zone below it.

The wells used to establish and maintain the hydraulic barriers may be a combination of vertical and/or horizontal injection wells, or wells having intermediate orientations. In most cases, water will be a suitable injection fluid, and will be injected at rates which provide a reservoir pressure along the desired hydraulic barrier that is greater than the estimated gas pressure within the isolated region, so that the zone of high aqueous fluid pressure as a minimum confining pressure that is generally greater than the maximum gas pressure in the injected gas zone.

With the areal confinement of the injected gas maintained by adjusting the hydrodynamic conditions, water in the target region of the aquifer is displaced downwardly by the injected gas within the confined target area, and the water thus displaced downwardly is produced at a suitably placed and appropriately completed water production well or wells within the isolated target region.

The temporary and reversible hydrodynamic isolation of the target region provided by placement and operation of the water injection wells may in some embodiments be combined with alternative techniques for isolating the target area, such as material barriers, plugging substances, viscosifying fluids, emulsifying fluids, or other types of mobility control agent.

Elements of the invention are illustrated schematically in FIGS. 1 and 2. FIG. 1 represents a vertical cross-sectional view, in which an aquifer or water zone 10, an underlying zone 20 which may consist of an impermeable material, such as shale, or may consist of a low transmissivity reservoir material, such as a bitumen zone or oil sand that is in hydraulic contact with the water zone 10. Overlying the aquifer or water zone is an impermeable material 30, such as a shale.

In selected embodiments, the invention may be used to de-water target zones that are from a few meters to a few tens of meters thick, for example from 3 m to 40 m. However, embodiments outside of this range are also contemplated. The aqueous fluid zones may for example be top or bottom water zones, or water zones contained within a hydrocarbon reservoir. Candidate formations may have a wide range of porosities and permeabilities, for example from fractured carbonates where porosity may be quite low to unconsolidated formations having very high porosities. The invention may be used to dewater target zones with permeabilities which are very low or as high as 20 Darcy or more.

As shown, one or more gas injection wells 40 are located within a target region, with water injection wells 50 (barrier wells) present along the target region boundaries as necessary. One or more water production wells 60, are located at or near the base or low point of the target region. Each of the wells, 40, 50, 60, may be either horizontally or vertically oriented, or otherwise directionally drilled or, where there is a multiplicity of such wells, a combination of horizontally and vertically or otherwise directionally oriented wells.

The subsequent description will, for purposes of simplicity, refer to the well elements in singular, with the understanding that a multiplicity of vertical and/or horizontal and/or directional wells can be substituted for the singular instance.

Initially, the porous and permeable medium within the water zone or aquifer 10 may be fully or preponderantly saturated with water 11. For example, the porous medium of an independent or isolated aquifer may be saturated 100 percent with water. Alternatively, the porous medium of a water zone or aquifer that is located above and in hydraulic contact or pressure communication with an oil sand may be saturated for example 90 percent with water and 10 percent with immobile bitumen. In either case, the only or principal mobile liquid at original formation conditions is the water. Removal of water from the water zone or aquifer 10 over some defined area is desired. For example, it may be desirable to remove sufficient water within a region above the bitumen zone or oil sand 20 so that, subsequent to the water removal phase, suitable in situ recovery techniques can be applied within the oil sand to effect the recovery of bitumen.

A gas injection well 40, is drilled and completed, or an existing well is adapted for this purpose. In the embodiment shown in the Figures, the gas injection well 40 is located with a natural non-porous boundary to the left in the schematic, and is completed at or near the top of the target region. As a non-condensing pressurized gas 41 is injected into the gas injection well 40, the gas 41 would generally tend to override the water and move outward at or near the top of the target region due to the density and viscosity difference between the gas 41 and water 11. Without lateral confinement, the gas 41 would continue to override the water 11 and would not facilitate an efficient downward displacement of the water 11.

To provide lateral confinement of the injected gas using exclusively hydraulic means, a water injection well 50 is drilled and completed, or an existing well is adapted for this purpose. Purely for illustrative purposes, the water injection well shown in the Figures is depicted as a horizontal well, although this need not be so. Water is injected at the water injection well 50 so that, in the vicinity of the water injection well, said injected water is at a pressure which exceeds the pressure of the approaching gas 41 so that a hydraulic barrier 80 is created which prevents the injected gas 41 from moving laterally (horizontally) beyond the hydraulic barrier, the hydraulic barrier being comprised of a zone of high aqueous fluid pressure that has a minimum pressure (the confining pressure) that is greater than the maximum gas pressure in the injected gas zone.

In addition, a water production well 60 is drilled within the target region, and completed at or near the base of the target region, or an existing well is adapted for this purpose. A combination of aquifer water and injected water is produced by water production well 60. Thus, in addition to creating a hydraulic barrier 80 to impede the horizontal flow of gas, the water injection well 50 concurrently provides water 61, either directly or through displacement, to the water production well 60 and thereby mitigates the adverse effects of gas channeling or fingering or coning, as measured by producing gas/water ratio, on the ability of the water production well 60 to produce efficiently. The specific pressures and rates employed at the gas injection well 40, the water injection well 50 and the water production well 60, can be initially estimated from calculation-based techniques, such as simulation, and can be refined in the field, it being understood that the pressure in the reservoir or target region at or surrounding or in the vicinity of the water injection well should exceed the pressure in the approaching gas zone so as to create an effective hydraulic barrier.

Gas injection well 40 is located within the target region, typically within the upper or middle portion of the target region. While gas injection to the lower region of the target region may be possible in some embodiments, typically gas injection will be less effective if the gas injection occurs in close proximity to the water production well. That is, in general gas production from the target region should be minimized for efficiency, and accordingly the gas injection wells will typically be located an appropriate distance from the barrier wells and from the water production wells. In some systems, a single injection well may deliver injected gas to more than one target region, or to more than one location within a single target region. Further, several gas injection wells may deliver injected gas within a single target region.

With reference to the embodiment shown in FIG. 2, the gas-water interface is shown during a stage of operation in which downward advance of the injected gas and concomitant displacement of the water is ongoing.

The hydraulic barrier generated by operation of barrier wells 50 defines the boundaries of the target region in which water displacement takes place. Accordingly, the location of the barrier wells is selected based on the location of the target region to be isolated and displaced. Further, the spacing of the barrier wells may be determined based on desired water injection rates. In general, a greater spacing between barrier wells may require greater injection rates to ensure that the integrity of the hydraulic barrier is maintained between adjacent wells.

The barrier wells 50 are generally operated so that the pressure of the water within the vicinity of the water injection well is incrementally higher than the pressure of the approaching gas 41, that increment being of a magnitude sufficient to create a hydraulic flow barrier 80 such that the injected gas 41 is confined within the hydraulic barrier. The injected gas 41, surrounded by the circumferential zone of high aqueous fluid pressure, will thus be forced to advance downward, displacing water downward and towards the water production well 60. Ultimately, the operation may be continued so that the water within the confined target region is substantially displaced and produced. Concurrently, water production well 60 may be operated at a production rate suitable to function as a hydraulic sink for both water displaced by the gas injection well 40 and water displaced by the water injection well 50, while preventing or minimizing gas channeling or fingering or coning at the water production well 60. This balance may for example be maintained by monitoring the producing gas/water ratio.

As shown in FIG. 2, the production well is located within the target region. That is, the production well is positioned within the gas-confining barrier defined or delimited by the hydraulic pressure barrier 80 approximated in the schematic, generated by water injection into water injection well 50.

This is further illustrated in plan view in the particular embodiment depicted in FIG. 3. In this depiction, four horizontal water injection wells 51, 52, 53 and 54, form a square configuration and, as a result of their water injection operations, create a confined region or perimeter, manifested by the presence of a surrounding hydraulic barrier 80, forming the circumferentially continuous zone of high aqueous fluid pressure, within which pressurized gas is being concurrently injected at gas injection well 40.

As mentioned above, displacement of water from the isolated target region (along with injected water) may advantageously be accomplished by a completing the water production well near the base of the confined target region defined by hydraulic barrier 80. Thus, in the embodiment depicted in FIG. 4 by way of illustration, four horizontal water production wells 61, 62, 63 and 64 are situated within the target region (i.e., are completed within the target region), and are therefore within the lateral boundaries defined by the hydraulic barrier 80.

In alternative embodiments, water that is produced from production wells that are located within a hydraulically constrained or confined target region may be diverted or recirculated, in whole or in part, so as to re-enter the aqueous fluid zone at the water injection well or wells or, additionally, via other wells that may be completed within the reservoir or aquifer but which are located outside of or beyond the hydraulically confined target region. Alternatively, a portion or all of the produced water may be diverted to locations that do not involve re-circulation.

Simulations have shown that the systems and methods of the invention may be applied at depths involving relatively high pressures and relatively high pressure gradients that are effective to counteract the effects of the density difference between gas and water, overcoming the tendency of the gas to override the water and move laterally outward by maintaining a minimum confining fluid pressure around the target region that is both: a) greater than the maximum aqueous fluid pressure at the top of the low pressure aqueous fluid zone; and, b) greater than the maximum gas pressure in the injected gas zone.

It has been found that conventional recharge/withdrawal well simulation techniques based on single-phase flow source-sink theory is generally not a valid approach in the context of the present invention. The injection of a gas phase, which is immiscible with the water and which is of significantly lower density, requires the application of non-linear flow concepts, in contrast to the linear flow concepts which form the basis of single-phase flow theory employed in conventional de-watering techniques. This non-linear characteristic of the flow or displacement regime is further exacerbated by the highly unfavorable viscosity contrast between the injected gas and the water which it displaces, which contrast promotes the tendency of the gas to channel non-uniformly through the water phase and into the water production well or wells.

The water injection well or wells may be positioned and operated so as to mitigate channeling or fingering or coning of gas into the water production well or wells, as evidenced by a reduction in produced gas/water ratio, as the gas-water interface migrates vertically downward over time, while allowing the water production well to operate at sufficiently high flow rates to permit a net withdrawal or removal of water from the confined target region.

The method and system described herein has been exemplified both by analytical equations, which describe the fluid regime associated with gas injection, water injection and water production, and by reservoir modeling.

Reference to wells in the foregoing discussion, whether involving gas injection or water injection or water production, can imply that a well is oriented either substantially horizontally or substantially vertically, or it can possess some alternative directional trajectory. Thus, referring to vertical and horizontal wells by way of example, in one embodiment, the gas injection well may be substantially vertical. However, an array of vertical gas injection wells, or one or more horizontal gas injection wells could also be used. Similarly, water could be injected into a single substantially horizontal water injection well, or into more than one substantially horizontal water injection well, or into an arrangement of vertical wells so situated and so completed as to function in aggregate as an approximation of the horizontal water injection well or wells from a flow and pressure perspective. Analogously, the water producing function could be performed by a single substantially horizontal water production well, or by more than one substantially horizontal water production well, or by an arrangement of vertical wells so situated and so completed as to function in aggregate as an approximation of the horizontal water production well or wells from a flow perspective. Furthermore, within any one of these functions, a suitably designed mix of horizontal and vertical wells could be employed.

The foregoing description can be extended to include a multiplicity of lateral directions surrounding a gas injection well, or group of gas injection wells, so that a hydraulic constraint is created in each of these directions by a water injection well or wells, and so that an areally closed region is created, strictly by means of hydraulic constraints, throughout which water removal is occurring. However, in the event that the region of the aquifer from which water is to be removed or displaced is bound on one or more sides by natural constraints or boundaries, such as lithology (e.g., facies changes) or reservoir structure (e.g., pinch-out or fault), those particular sides may not require the creation of a hydraulic boundary in order to effect water removal. In that event, areal confinement may be achieved by a combination of natural boundaries and hydraulically imposed barriers.

In selected embodiments, alternative methods are available for monitoring the integrity of the hydraulic barrier, either alternatively or together, during operation. One method involves monitoring conditions external to the hydraulic barrier and the second involves monitoring conditions within the hydraulically isolated region. Monitoring the conditions external to the barrier may involve the use of observation wells outside the barrier to detect the presence of gas, for example by sampling or logging or both. Within the hydraulically isolated region, the position of the gas/water contact can be monitored and, using mass balance calculations, can be compared against a calculated position of the contact to identify any discrepancies that would imply leakage outside the region.

As the water removal process within the aquifer is an evolving one, and is therefore hydrodynamic, adjustments to the rates of gas injection, water injection and water production, and the associated pressures at these wells, may be required throughout the period of operation. Also, new wells may be added from time to time and existing wells shut in as required to maintain the conditions necessary to remove water from the aquifer, including the means of injecting water to sustain hydraulic barriers and the concurrent means, achieved by that same water injection operation, of inhibiting or mitigating gas channeling or fingering or coning at the water production wells. Suitable tactics to accommodate the dynamic nature of this process in a given situation, all while conforming to the present teachings, can be developed by one skilled in the art using two-phase immiscible displacement techniques.

Examples

Figure 6:
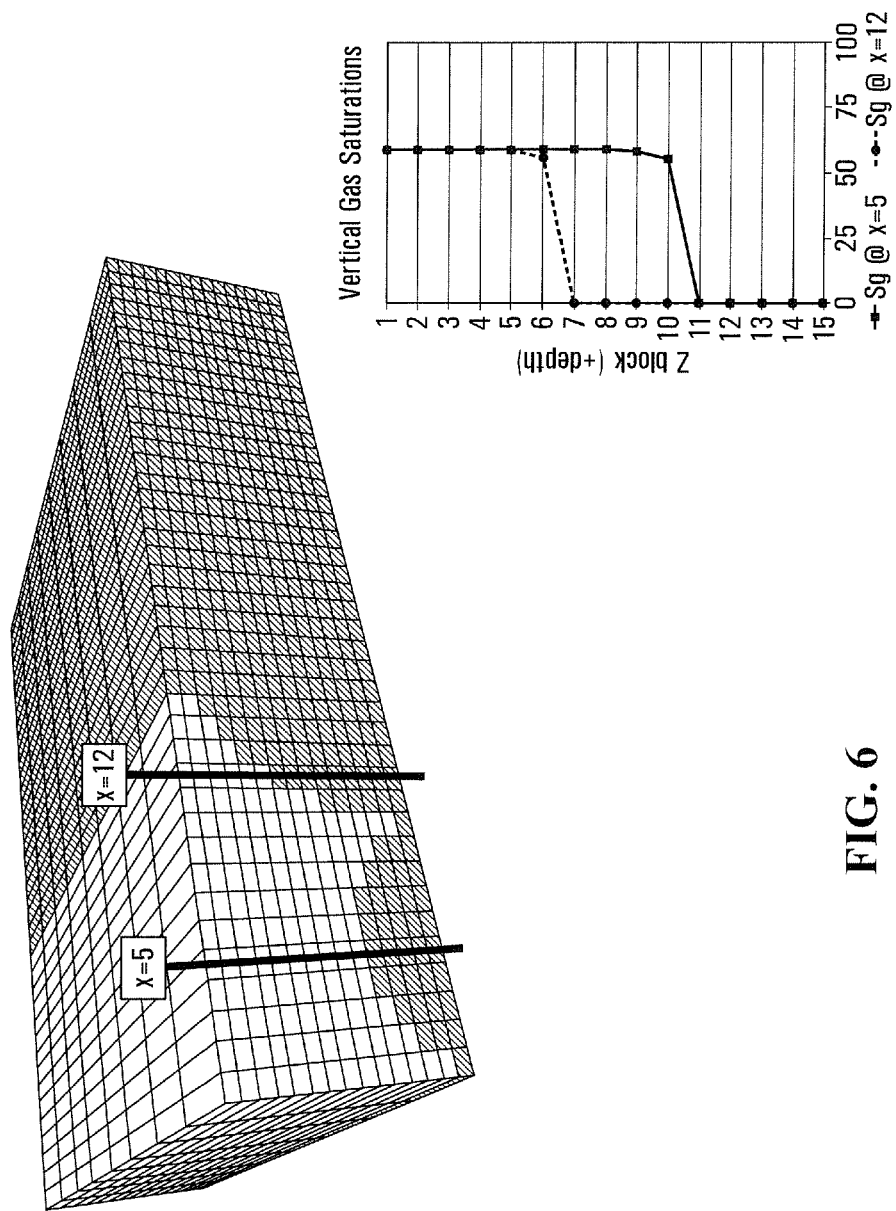
FIG. 6 is a three dimensional computer simulated schematic of a progressing displacement operation corresponding to the well configuration shown in FIG. 5, graphically illustrating vertical gas saturations (Sg) at vertical positions designated x=5 and x=12.

With reference to FIGS. 5 and 6, simulation results are shown in half-element form. The model accounts for two-phase immiscible flow in a porous medium, including viscosity and density differences between the gas and the water.

FIG. 5 illustrates the model set-up. For simplicity of illustration, by using a half-element representation, hydraulic confinement is carried out in only one direction, and a single horizontal water injection well positioned to create this hydraulic confinement or barrier is depicted. Gas injection occurs at the near face of the model, and water production at or near the base of the target region is effected using, in this illustration, two water production wells 60. In accordance with the teaching described above, the water production wells 60 are situated so that they are located within the boundaries of the target region, as defined by the imposed hydraulic barrier created through operation of the water injection well. To create this hydraulic barrier, the water injection well 50 is operated at a pressure such that the pressure in the vicinity of said water injection well is sufficiently high to prevent or mitigate lateral migration of the gas past the hydraulic barrier thus created. That is, in the course of operating the water injection well so that its surrounding reservoir pressure exceeds that of the approaching gas, a no-flow boundary occurs in the region between the water injection well and the approaching gas which constitutes the effective hydraulic barrier to lateral migration of the gas.

FIG. 6 illustrates, by means of simulation, the situation after the system has been allowed to operate for six months. As indicated, substantial water is removed as a result of operations at both production wells and, concurrently, the lateral migration of the gas is hydraulically constrained. Thus, the water injection well serves a concurrent dual purpose of constraining lateral gas migration and also inhibiting gas channeling or fingering or coning into the water production wells, as measured by producing gas/water ratio, such that water may be removed from said water production wells at practical rates.

The series of depictions comprising FIG. 7 illustrates a computer simulation, showing the progression of a method in accordance with one embodiment, in which all wells are horizontal. In this example, there are four water injection wells which create the hydraulic barrier, one gas injection well, and two water production wells. Regarding the particular simulation shown in FIG. 7, top water thickness was 10 m, porosity was 34%, permeability was 5 to 10 D, oil saturation was 20%, and the displacement area was 600 m×600 m. The operating parameters for this example were as follows: gas injection pressure of 1150 kPa, gas injection rate of 50,000 to 100,000 sm/d, water injection pressure of 1180 kPa, water injection rate of 1000-3000 m/d/well, and water production rate of 1000-4000 m3/d/well.

Figure 7A:
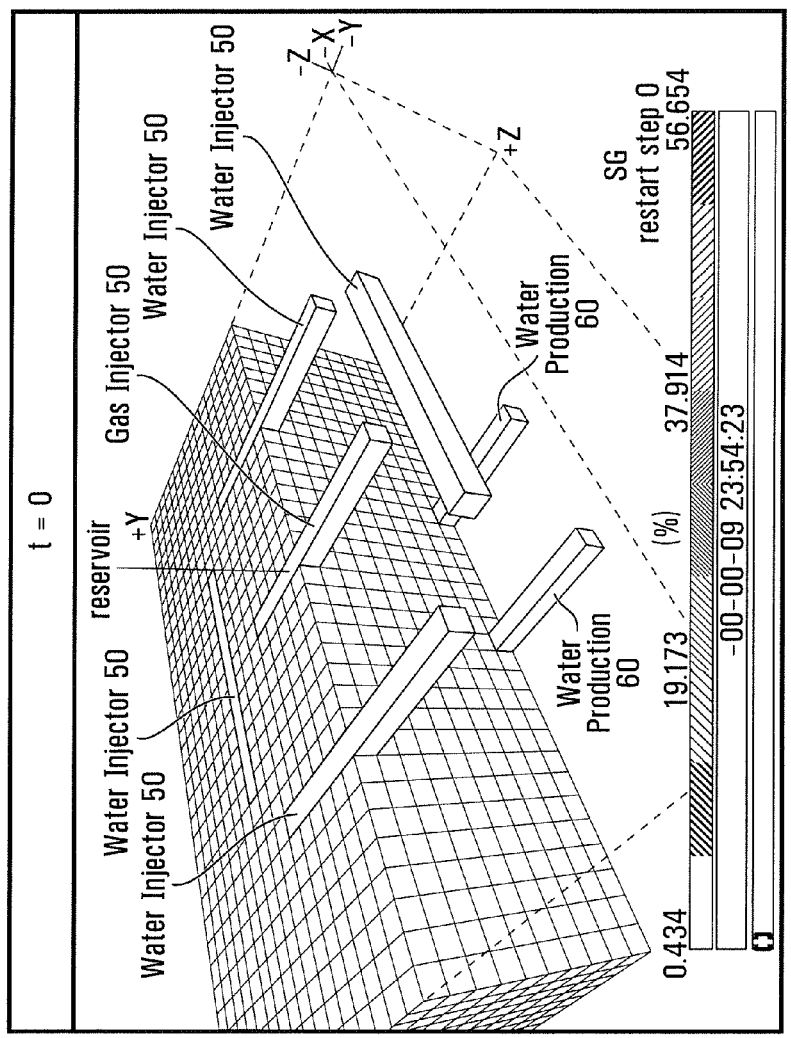
FIGS. 7A-7E are a series of three dimensional (X, Y and Z axes) computer simulated schematics depicting the well configuration and progression of an example displacement operation showing gas saturations (SG).
Figure 7B:
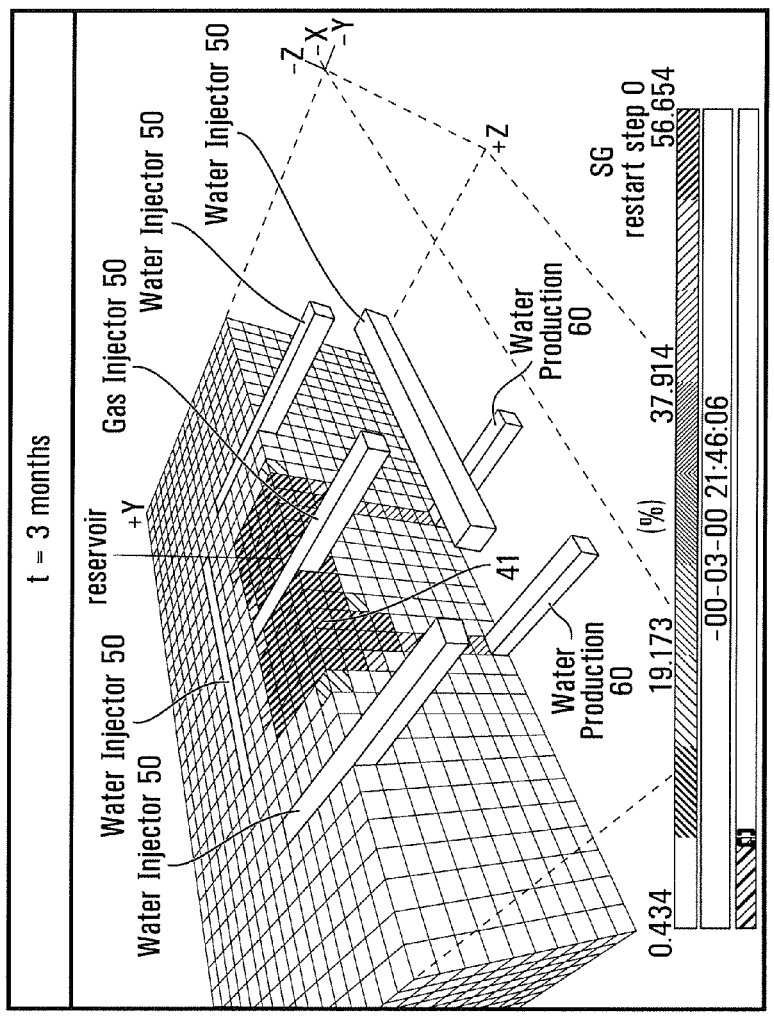
Figure 7C:
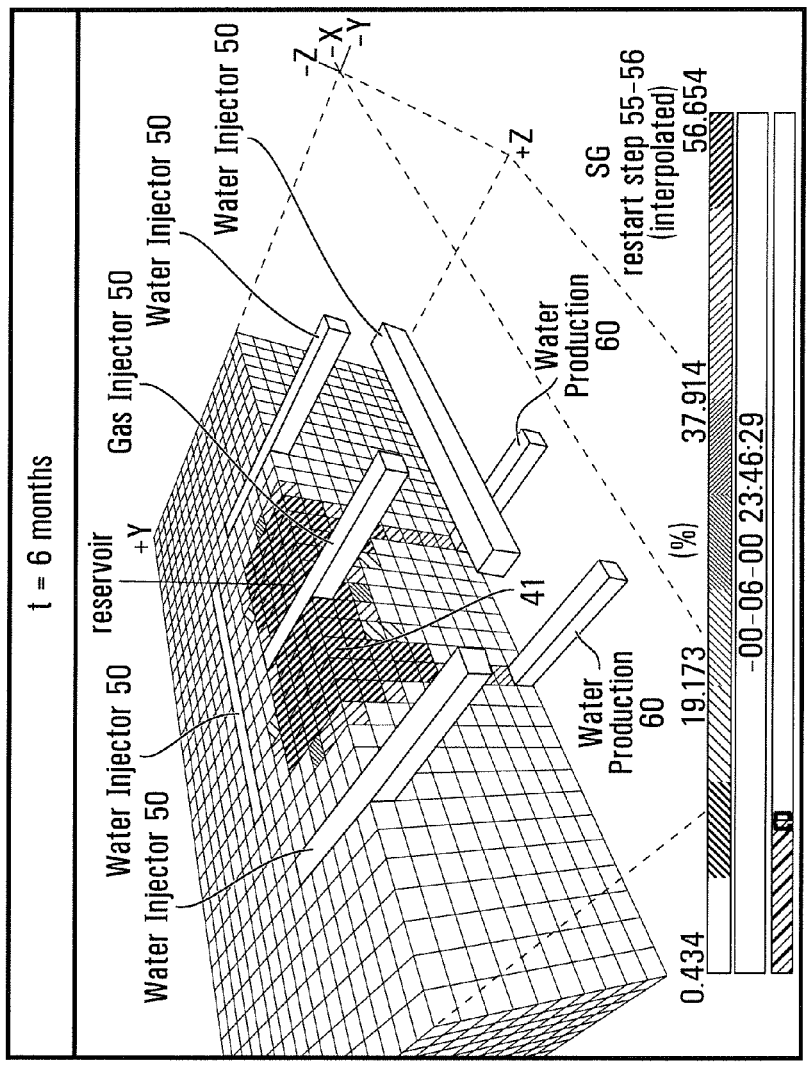
Figure 7D:
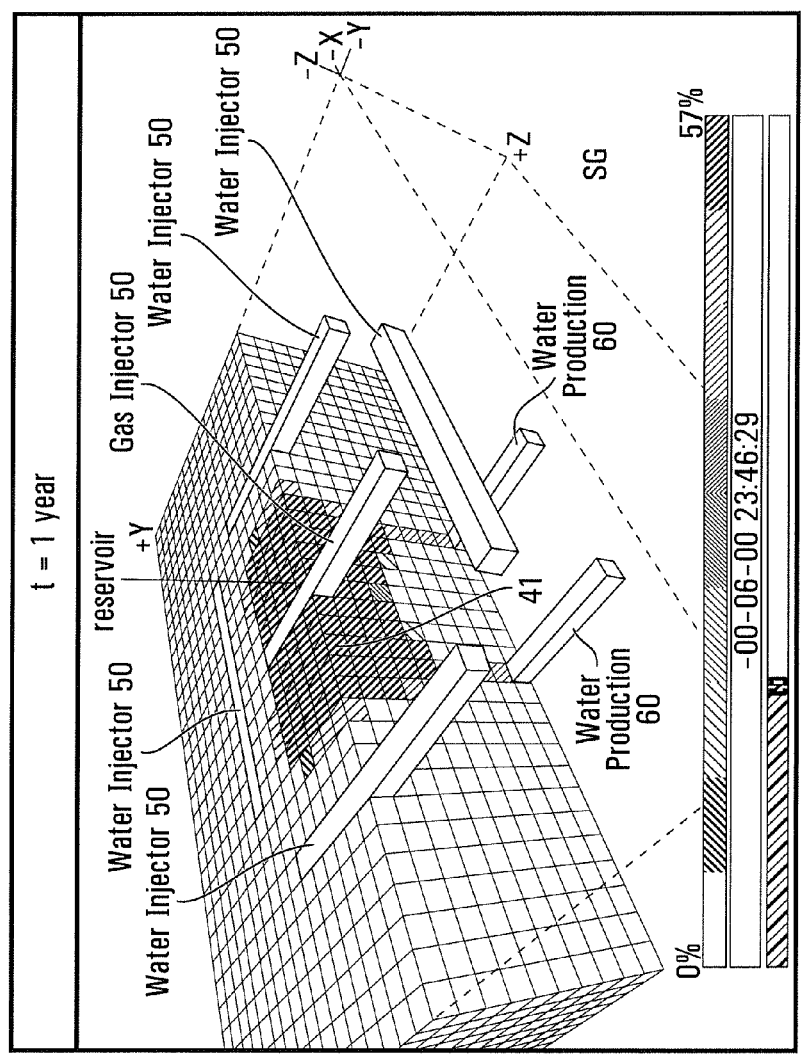
Figure 7E:
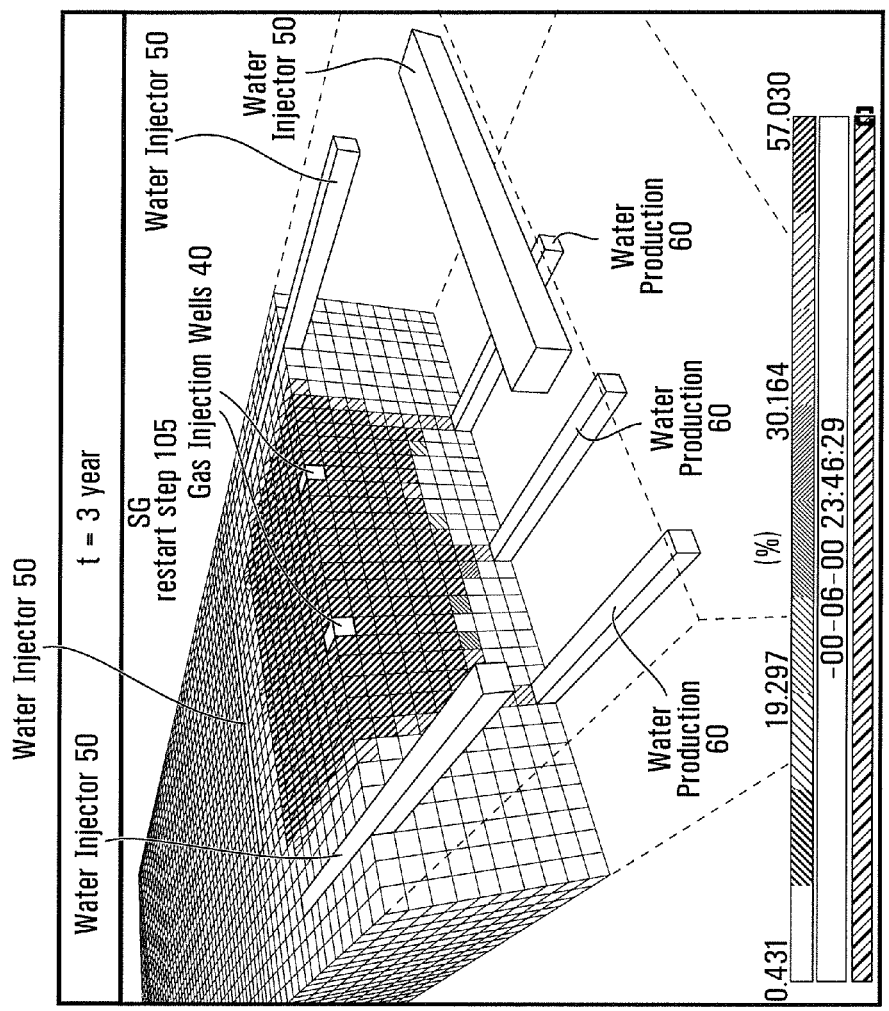
Figure 8A:
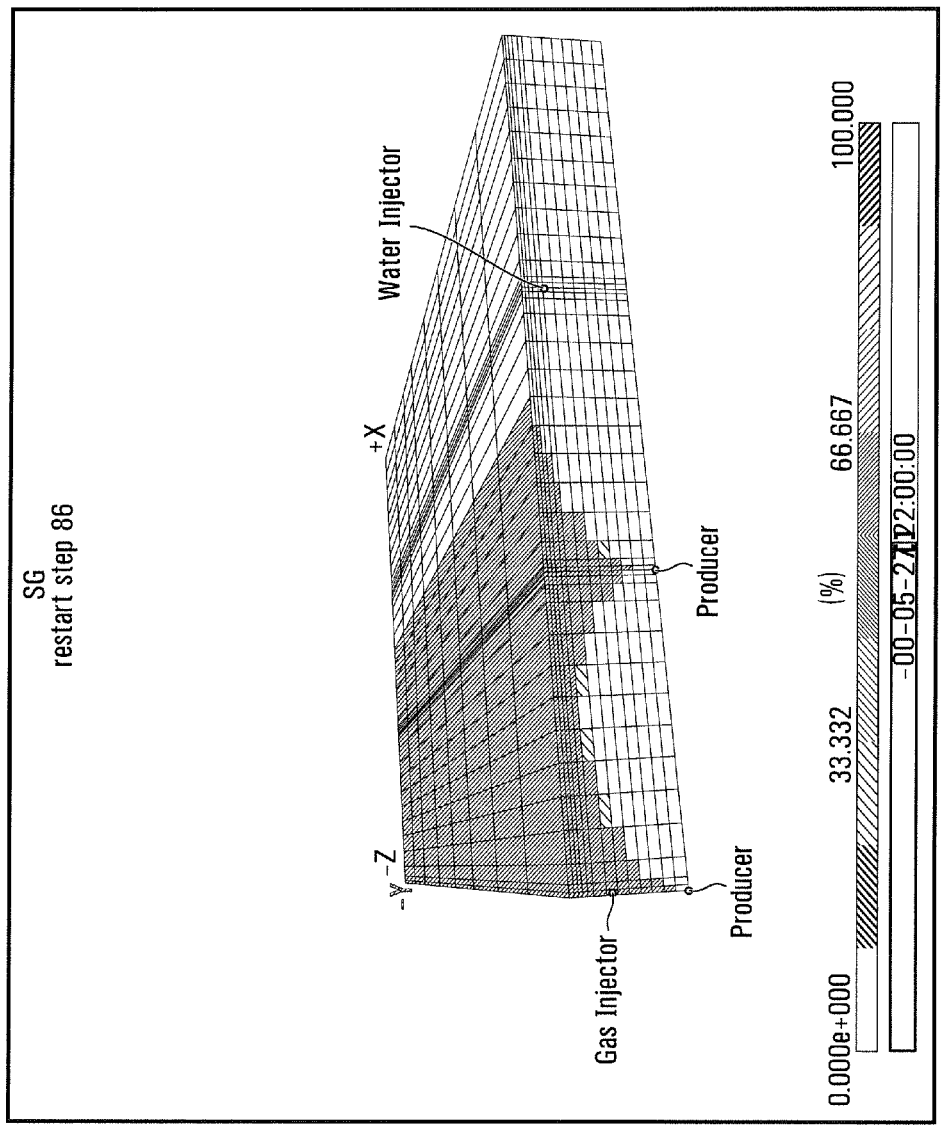
FIGS. 8A-8F are a series of three dimensional (X, Y and Z axes) computer simulated schematics depicting the well configuration and progression of an example displacement operation in a mobile water zone, showing gas saturations (SG) with gas zone at the initial reservoir pressure with barrier injection wells and with gas zone at 200 kPa below the initial reservoir pressure without barrier injection wells
Figure 8B:
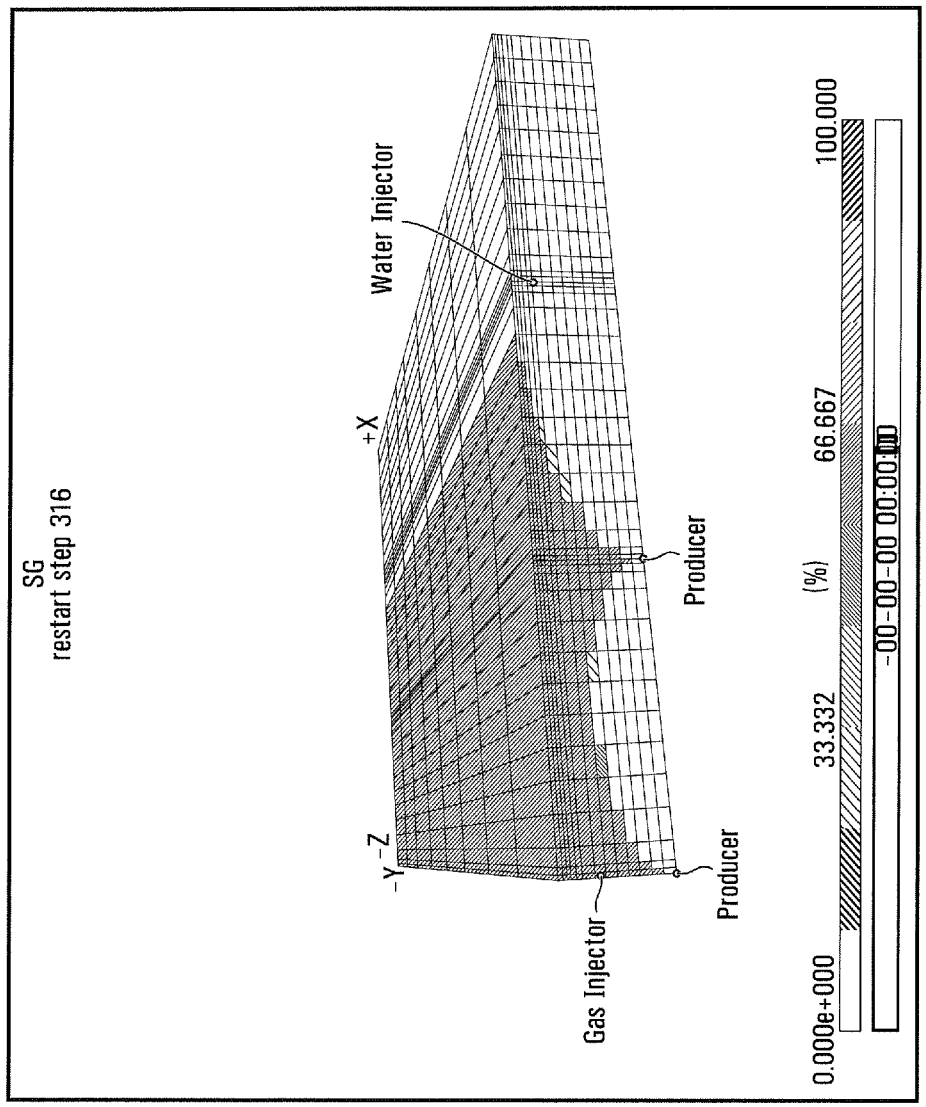
Figure 8C:
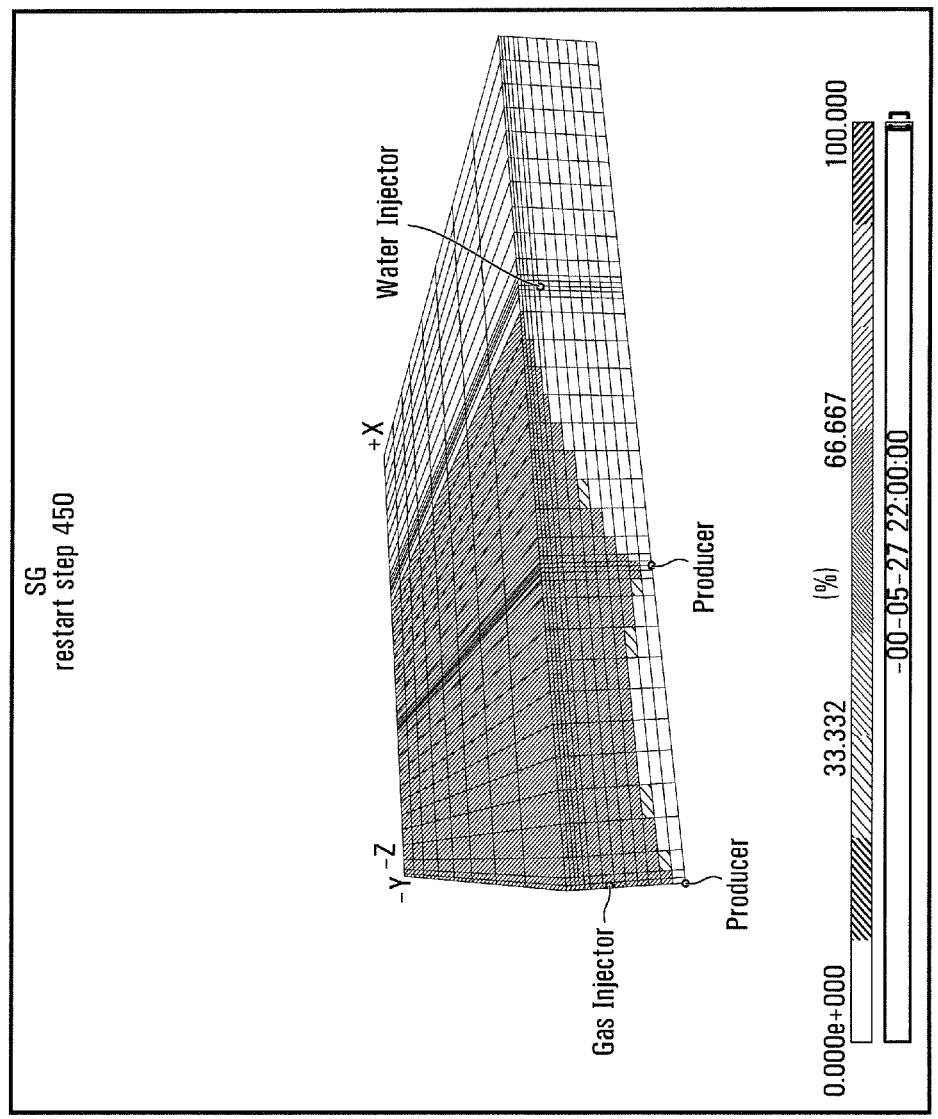
Figure 8D:
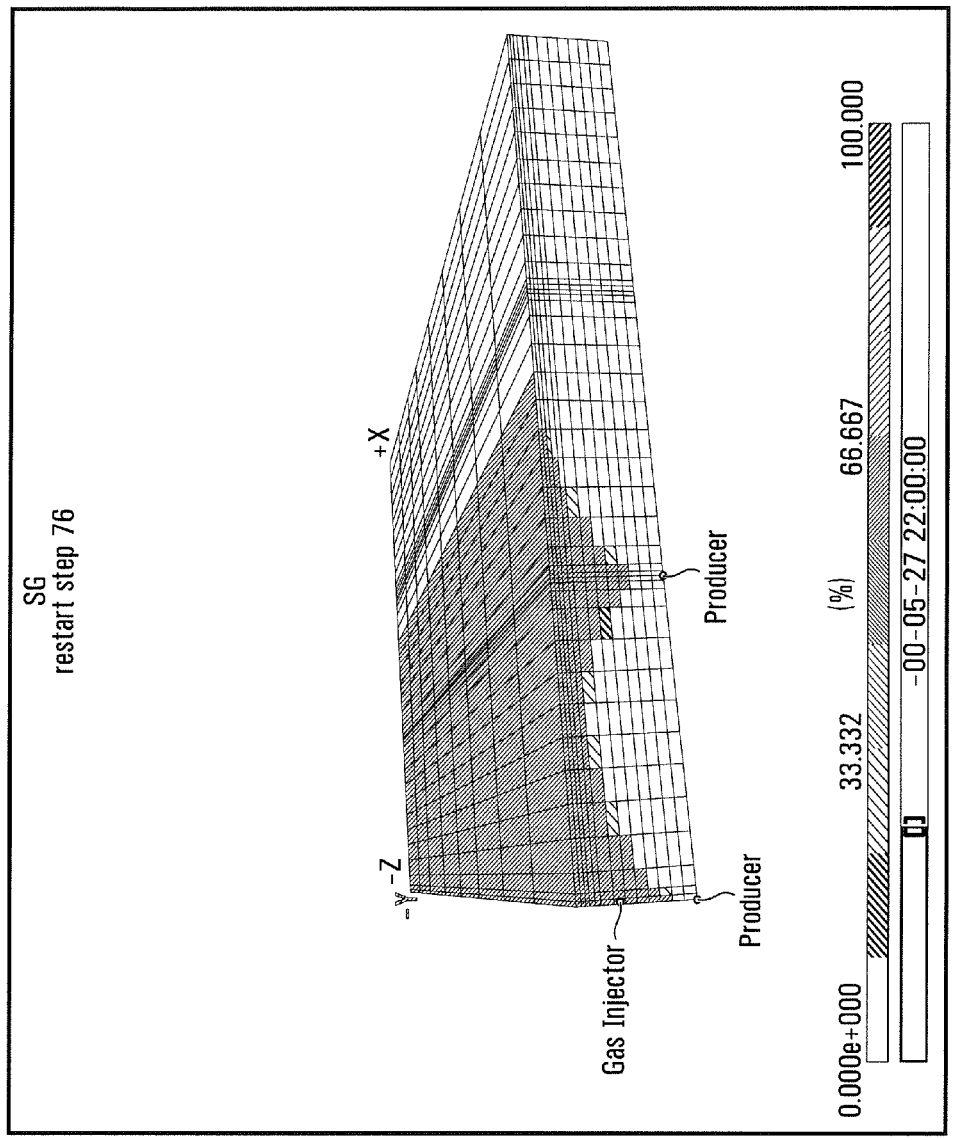
Figure 8E:
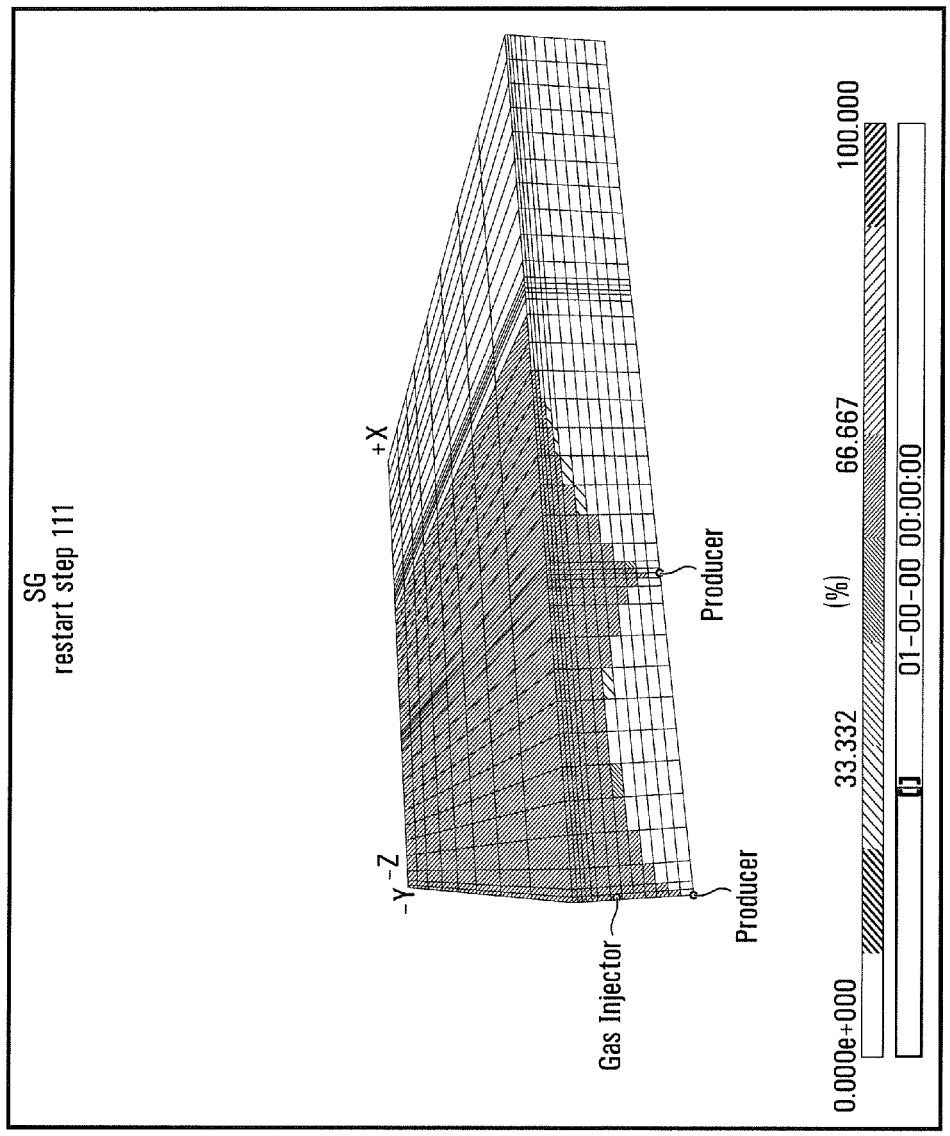
Figure 8F:
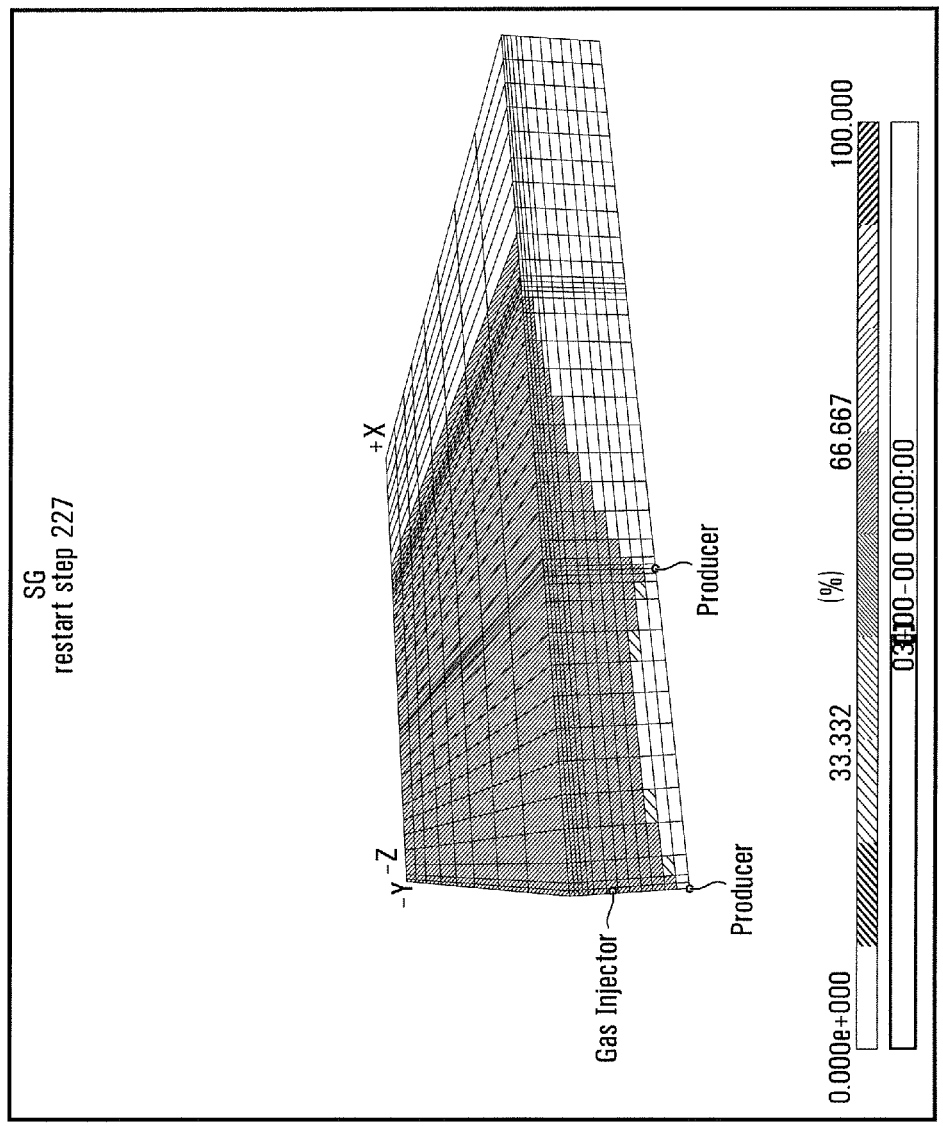

FIG. 7A depicts initial conditions, with no gas having yet been injected. FIG. 7B illustrates the situation after 3 months of operation. Gas is advancing from the gas injection well towards the water injection wells and, in so doing, has already encountered the laterally constraining hydraulic barriers imposed by the water injection wells. This is evidenced by the fact that, unable to continue its lateral movement, the gas has begun to move downward and, in so doing, displace water to the water production wells. Also, note that some gas channels downward to the production wells. However, simulations indicate that the water injection wells, in addition to imposing a hydraulic barrier, concurrently mitigate the tendency of the gas to channel into the water production wells. FIGS. 7C, and 7D depict the situation at successively more advanced stages of the operation. FIG. 7E depicts a similar operation simulated to 3 years of elapsed time. As indicated, the hydraulic barriers continue to be effective in constraining the gas laterally so that downward displacement of the water by gas progresses throughout the time period. It is noteworthy that, while water injection occurs at or near the top of the formation, the combined action of water injection and water production well creates an effective hydraulic barrier at all elevations within the reservoir.

FIG. 8 illustrates a simulated comparison of alternative embodiments, with and without the injection of water in circumferential barrier injection wells. In the embodiment without the barrier injection wells, water production wells are operated to produce a zone of low pressure. This zone of reduced water pressure induces an inflow of water from the surrounding area of higher water pressure, and this water flow acts in effect to contain the injected gas. The degree of gas containment may be controlled by how low the pressure is maintained in the low pressure zone. In one aspect of this arrangement of wells, if the water pumps fail for example, the hydrodynamics of the zones may be arranged to continue to contain the injected gas zone by producing some of the gas, maintaining the relative pressure differential between the injected gas zone and the surrounding higher pressure water zone. This illustrates the surprising resilience of the hydrodynamic system of the invention, which in this example maintains pressure gradients of up to hundreds of kPa per km. In alternative embodiments, these simulations suggest, as a further example of the resilience of the system, that within a water zone that is approximately 40 m thick, by aggressively limiting the size of the gas zone by re-injecting water at high rates, the pressure differentials could approach a few thousand kPa per km.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for selectively displacing aqueous fluid from a hydraulically continuous aqueous fluid zone of a permeable geological formation, the method comprising:
   a) selecting a target region of the formation that is in pressure communication with a hydrocarbon reservoir;
   b) hydrodynamically adjusting aqueous fluid pressures within the hydraulically continuous aqueous fluid zone, so as to provide a horizontal fluid pressure differential within the hydraulically continuous aqueous fluid zone, to define a lower pressure aqueous fluid zone, having a top and a bottom, within a higher pressure aqueous fluid zone, having a top and a bottom, so that the higher pressure aqueous fluid zone comprises a circumferential zone of higher aqueous fluid pressure,
   c) injecting a gas into the lower pressure aqueous fluid zone to displace aqueous fluid, producing a displaced aqueous fluid, and forming an injected gas zone in the formation above the top of the lower pressure aqueous fluid zone in place of the displaced aqueous fluid, so that the top of the lower pressure aqueous fluid zone moves downwardly with respect to the top of the higher pressure aqueous fluid zone as the injected gas zone expands; and,
   d) maintaining hydrodynamic conditions in the hydraulically continuous aqueous fluid zone so that the circumferential zone of higher aqueous fluid pressure has a minimum confining fluid pressure that is:
      i) greater than a maximum aqueous fluid pressure in the lower pressure aqueous fluid zone; and,
      ii) greater than a maximum gas pressure in the injected gas zone.

2. The method of claim 1, wherein the hydrodynamically adjusting aqueous fluid pressures within the hydraulically continuous aqueous fluid zone comprises injecting an aqueous injection fluid into the higher pressure aqueous fluid zone, to form the circumferential zone of higher aqueous fluid pressure.

3. The method of claim 2, wherein the hydrodynamically adjusting aqueous fluid pressures within the hydraulically continuous aqueous fluid zone comprises producing aqueous fluid from the target region to form the lower pressure aqueous fluid zone.

4. The method of claim 3, wherein the circumferential zone of higher aqueous fluid pressure is a circumferentially continuous zone of higher aqueous fluid pressure that surrounds the target region.

5. The method of claim 4, further comprising providing a gas injection well within the target region, and operating the gas injection well to inject the gas into the lower pressure aqueous fluid zone.

6. The method of claim 5, further comprising providing an aqueous fluid production well within the target region, and operating the aqueous fluid production well to produce the displaced aqueous fluid.

7. The method of claim 6, further comprising operating the gas injection well and the aqueous fluid production well concurrently to effect a net production of water from the target.

8. The method of claim 6, further comprising providing a series of barrier injection wells positioned to define a circumferential boundary of the target region, wherein the hydrodynamically adjusting aqueous fluid pressures within the hydraulically continuous aqueous fluid zone comprises operating the barrier injection wells to inject the aqueous injection fluid into the higher pressure aqueous fluid zone, to form the circumferential zone of higher aqueous fluid pressure.

9. The method of claim 8, further comprising operating the gas injection well, the aqueous fluid production well and the barrier injection wells concurrently to effect a net production of water from the target region.

10. The method of claim 9, further comprising monitoring a composition of a portion of the aqueous fluid of the geological formation outside the target region.

11. The method of claim 10, further comprising monitoring a concentration of the gas in the displaced aqueous fluid produced.

12. The method of claim 11, further comprising controlling a production rate of the displaced aqueous fluid produced so as to reduce the concentration of the gas in the displaced aqueous fluid produced.

13. The method of claim 12, wherein the gas is air, carbon dioxide, nitrogen, methane, exhaust gas, enriched air, or oxygen.

14. The method of claim 13, further comprising recovering a hydrocarbon resource from the hydrocarbon reservoir.

15. The method of claim 14, wherein the hydrocarbon resource is recovered by a thermal process operated to form an expanding heated chamber that contacts the target region.

16. The method of claim 15, wherein the thermal process is steam assisted gravity drainage (SAGD) and the heated chamber is a steam chamber.

17. The method of claim 16, wherein the SAGD process is operated so that a pressure within the steam chamber is approximately the same as a pressure in the injected gas zone when the steam chamber contacts the injected gas zone in the target region.

18. A system for selectively displacing aqueous fluid from a target region of a hydraulically continuous aqueous fluid zone of a permeable geological formation, wherein the target region is in pressure communication with a hydrocarbon reservoir, the system comprising:
  a) means for hydrodynamically adjusting aqueous fluid pressures within the hydraulically continuous aqueous fluid zone, so as to provide a horizontal fluid pressure differential within the hydraulically continuous aqueous fluid zone, to define a lower pressure aqueous fluid zone, having a top and a bottom, within a higher pressure aqueous fluid zone, having a top and a bottom, so that the higher pressure aqueous fluid zone comprises a circumferential zone of higher aqueous fluid pressure,
  b) means for injecting a gas into the lower pressure aqueous fluid zone to displace aqueous fluid, and produce a displaced aqueous fluid, thereby forming an injected gas zone in the formation above the top of the lower pressure aqueous fluid zone in place of the displaced aqueous fluid, so that the top of the lower pressure aqueous fluid zone moves downwardly with respect to the top of the higher pressure aqueous fluid zone as the injected gas zone expands; and,
  c) means for maintaining hydrodynamic conditions in the hydraulically continuous aqueous fluid zone so that the circumferential zone of higher aqueous fluid pressure has a minimum confining fluid pressure that is:
    i) greater than a maximum aqueous fluid pressure of the lower pressure aqueous fluid zone; and,
    ii) greater than a maximum gas pressure in the injected gas zone.

19. The system of claim 18, wherein the means for hydrodynamically adjusting aqueous fluid pressures within the hydraulically continuous aqueous fluid zone comprise means for injecting an aqueous injection fluid into the higher pressure aqueous fluid zone, to form the circumferential zone of higher aqueous fluid pressure.

20. The system of claim 19, wherein the means for hydrodynamically adjusting aqueous fluid pressures within the hydraulically continuous aqueous fluid zone comprises means for producing aqueous fluid from the target region to form the lower pressure aqueous fluid zone.

21. The system of claim 20, wherein the circumferential zone of higher aqueous fluid pressure is a circumferentially continuous zone of higher aqueous fluid pressure that surrounds the target region.

22. The system of claim 21, wherein the means for hydrodynamically adjusting aqueous fluid pressures within the hydraulically continuous aqueous fluid zone comprise a gas injection well within the target region, and the gas injection well is adapted to inject the gas into the lower pressure aqueous fluid zone.

23. The system of claim 22, wherein the means for hydrodynamically adjusting aqueous fluid pressures within the hydraulically continuous aqueous fluid zone further comprises an aqueous fluid production well within the target region, and the aqueous fluid production well is adapted to produce the displaced aqueous fluid.

24. The system of claim 23, wherein the gas injection well and the aqueous fluid production well are adapted to operate concurrently to effect a net production of water from the target region.

25. The system of claim 23, wherein the means for hydrodynamically adjusting aqueous fluid pressures within the hydraulically continuous aqueous fluid zone further comprises a series of barrier injection wells positioned to define the circumferential boundary of the target region, and adapted to inject the aqueous injection fluid into the higher pressure aqueous fluid zone, to form the circumferential zone of high aqueous fluid pressure.

26. The system of claim 25, wherein the gas injection well, the aqueous fluid production well and the barrier injection wells are adapted to operate concurrently to effect a net production of water from the target.

27. The system of claim 26, further comprising means for monitoring a composition of a portion of the aqueous fluid of the geological formation outside the target region.

28. The system of claim 27, further comprising means for monitoring a concentration of the gas in the displaced aqueous fluid produced.

29. The system of claim 28, further comprising means for controlling a production rate of the displaced aqueous fluid production so as to reduce gas concentrations in the displaced aqueous fluid produced.

30. The system of claim 29, wherein the gas is air, carbon dioxide, nitrogen, methane, exhaust gas, enriched air, or oxygen.

31. The system of claim 30, further comprising means for recovering a hydrocarbon resource from the hydrocarbon reservoir.

32. The system of claim 31, wherein the means for recovering the hydrocarbon resource comprises means for operating a thermal process to form an expanding heated chamber that contacts the target region.

33. The system of claim 32, wherein the thermal process is steam assisted gravity drainage (SAGD) and the heated chamber is a steam chamber.

34. The system of claim 33, wherein the means for operating the SAGD process is adapted to operate so that a pressure within the steam chamber is approximately the same as a pressure in the injected gas zone when the steam chamber contacts the injected gas zone in the target region.

35. An arrangement of wells adapted to operate to selectively displace aqueous fluid from a target region of a hydraulically continuous aqueous fluid zone of a permeable geological formation, wherein the target region is in pressure communication with a hydrocarbon reservoir, the arrangement of wells comprising:
   a) one or more aqueous fluid wells adapted to hydrodynamically adjust aqueous fluid pressures within the hydraulically continuous aqueous fluid zone, so as to provide a horizontal fluid pressure differential within the hydraulically continuous aqueous fluid zone, to define a lower pressure aqueous fluid zone, having a top and a bottom, within a higher pressure aqueous fluid zone, having a top and a bottom, so that the higher pressure aqueous fluid zone comprises a circumferential zone of higher aqueous fluid pressure,
   b) one or more gas injection wells adapted to inject a gas into the lower pressure aqueous fluid zone to displace the aqueous fluid to an aqueous fluid production well adapted to produce the displaced aqueous fluid, the injected gas forming an injected gas zone in the formation above the top of the lower pressure aqueous fluid zone in place of the displaced aqueous fluid, so that the top of the lower pressure aqueous fluid zone moves downwardly with respect to the top of the higher pressure aqueous fluid zone as the injected gas zone expands; and, wherein the arrangement of wells is adapted to operate to maintain hydrodynamic conditions in the hydraulically continuous aqueous fluid zone so that the circumferential zone of high aqueous fluid pressure has a minimum confining fluid pressure that is:
   i) greater than a maximum aqueous fluid pressure at the top of the lower pressure aqueous fluid zone; and,
   ii) greater than a maximum gas pressure in the injected gas zone.

36. The arrangement of wells of claim 35, wherein the circumferential zone of higher aqueous fluid pressure is a circumferentially continuous zone of higher aqueous fluid pressure that surrounds the target region.

37. The arrangement of wells of claim 36, wherein the gas injection well and the aqueous fluid production well are adapted to operate concurrently to effect a net production of water from the target region.

38. The arrangement of wells of claim 37, wherein the aqueous fluid wells comprise a series of barrier injection wells positioned to define the circumferential boundary of the target region, and adapted to inject an aqueous injection fluid into the higher pressure aqueous fluid zone, to form the circumferential zone of higher aqueous fluid pressure.

39. The arrangement of wells of claim 38, wherein the gas injection well, the aqueous fluid production well and the barrier injection wells are adapted to operate concurrently to effect a net production of water from the target region.

40. The arrangement of wells of claim 39, further comprising monitoring wells for monitoring a composition of a portion of the fluid of the geological formation outside the target region.

41. The arrangement of wells of claim 40, further comprising a system for monitoring a concentration of the gas in the displaced aqueous fluid produced.

42. The arrangement of wells of claim 41, wherein the aqueous fluid wells are adapted to control a production rate of the displaced aqueous fluid produced so as to reduce the concentration of the gas in the displaced aqueous fluids produced.

43. The arrangement of wells of claim 42, wherein the gas is air, carbon dioxide, nitrogen, methane, exhaust gas, enriched air, or oxygen.

44. The arrangement of wells of claim 43, further comprising one or more recovery wells adapted to recover a hydrocarbon resource from the hydrocarbon reservoir.

45. The arrangement of wells of claim 44, wherein the recovery wells are adapted to operate a thermal process to form an expanding heated chamber that contacts the target region.

46. The arrangement of wells of claim 45, wherein the thermal process is steam assisted gravity drainage (SAGD) and the heated chamber is a steam chamber.

47. The arrangement of wells of claim 46, wherein the recovery wells are adapted to operate so that a pressure within the steam chamber is approximately the same as a pressure in the injected gas zone when the steam chamber contacts the injected gas zone in the target region.

* * * * *